United States Patent Office 2,959,625
Patented Nov. 8, 1960

2,959,625

MANUFACTURE OF ALKYL MAGNESIUM COMPOUNDS

Sidney M. Blitzer and Tillmon H. Pearson, Baton Rouge, La., assignors to Ethyl Corporation, New York, N.Y., a corporation of Delaware No Drawing. Filed Jan. 12, 1959, Ser. No. 786,002

5 Claims. (Cl. 260—665)

This invention relates to the manufacture of alkyl compounds of magnesium. More particularly, the invention relates to a new and highly effective process for the production of these valuable organometallic materials.

Magnesium alkyl compounds are becoming of increasing interest as intermediates in the manufacture of a number of chemical compounds as a highly effective replacement for the Grignard reagent. Grignard reagents, although extremely well known in the chemical field, are objectional in that they require alkyl halides, a relatively expensive reactant, for their preparation. The magnesium alkyl compounds of the present invention are useful in reactions with many salts or oxides of metals to form corresponding metal alkyls. For example, a typical product of the present invention, diethylmagnesium, is particularly suitable in the conversion of metal halides to their alkyl derivatives, for example the reaction with a mercury chloride or with a lead chloride to produce the corresponding metal alkyl.

The principal methods for preparation of magnesium alkyls, heretofore known, are classical laboratory preparative techniques which are not suitable for commercial processes. These techniques or reactions include, for example, the disproportionation of a Grignard to produce the magnesium dialkyl and a magnesium halide, for example:

$$2RMgX \rightarrow R_2Mg + MgX_2$$

It is seen that this procedure is inefficient, as a commercial method, because half of the magnesium results as a degraded product, magnesium chloride, which must be further treated to convert the magnesium into utilizable form. Another laboratory preparative technique involves the reaction of a more expensive, but easily prepared organometallic, such as a diethylmercury with magnesium metal. This results in the formation of the diethylmagnesium and releases mercury. It is clear that the raw materials involved in such an operation are quite expensive and that extremely high recoveries are necessarily involved. These factors mitigate against commercial preparation of the dialkylmagnesium compound. In view of the commercial importance and versatility of the magnesium alkyl products, it is apparent that an improved method for the economical and commercial production is in great demand.

It is accordingly an object of this invention to provide an improved process for the preparation of alkyl magnesium compounds. Another object is to provide a process for manufacturing alkyl magnesium compound which is economical, readily carried out in the commercial scale, and utilizes a minimum of process operations and economical and readily available raw materials. Another object is to provide a process for the production of dialkyl magnesium compounds directly from magnesium, or the readily produced feed component, magnesium hydride, and from an olefin hydrocarbon. A further object is to provide a highly effective catalyzed process of the above type for the preparation of dialkyl magnesium compounds.

It is now found that the desired alkyl magnesium compounds can be formed readily by reacting magnesium hydride in a reaction medium, and in the presence of a catalyst, with an olefin hydrocarbon. The reaction is carried out under elevated pressure which can, if desired, be as high as up to about 700 atmospheres, and also under moderately elevated temperatures. The temperatures can be from about 50° up to about 200° C. or higher, but a preferred temperature range is from around 90°, or even slightly lower, up to about 150° C. A preferred range of pressures is from about 30 to about 200 atmospheres pressure.

As already stated, the process is carried out in the presence of a reaction medium, the magnesium hydride employed being virtually insoluble therein and the alkyl magnesium compounds being fairly readily soluble. The importance of the reaction medium is thus two-fold, for highly effective maintenance of the chemical formation and for facilitating the separation or recovery of the product dialkyl magnesium compounds. The reaction media are certain liquids consisting of certain ethers, and aromatic hydrocarbon liquids which exhibit a good solvency for the alkyl magnesium product without significant attack thereon. The suitable solvents are the ethers having mild basicity, that is, a basicity of that of di-n-butyl ether or below. The effective ethers thus include diethyl ether, isopropyl ether, and others. Typical suitable aromatic hydrocarbons are benzene, toluene, xylene, trimethyl benzene, and others. The presence of an inert or inactive diluent liquid is not precluded in the present process, for example, an alkane hydrocarbon such as hexane, heptane or the like can be present, but it is also necessary that one of the enumerated types of solvents be present in significant quantities for the desired purpose.

As further stated above, the process is carried out in the presence of a catalyst. It is found that the combination of an olefin with magnesium hydride is greatly expedited or accelerated by the presence of a catalytic component, the catalyst being chosen from the group consisting of the hydrocarbon derivatives and hydrides of aluminum, zinc and boron. By hydrocarbon derivatives is meant compounds of these metals wherein the metal is bonded to one or more hydrocarbon radicals, either of the alkyl or aryl type. Typical examples of effective catalysts, then, are triethyl aluminum, diborane, diethyl aluminum hydride, diethyl zinc, and others as shown hereinafter. The catalysts can be employed in quite low concentrations, say, for example, of about a 1 mole percent concentration passed on the magnesium hydride charged. Preferably, however, higher proportions are provided, up to and even above a mole of catalyst per mole of magnesium hydride charged. When such high proportions are provided, however, somewhat more complicated recovery steps are required, owing to the necessity of conserving the catalyst.

The process can be carried out in either batch or continuous operations. The relative advantages of these general techniques depend mostly upon the scale of production involved. For most purposes, significant scale batch operations will be highly effective. In other instances, continuous processing is desired for greatest economies. The reaction time, that is, the time which would be employed in the typical batch or cyclic type of operation, varies with the reactants and operating conditions. In general, reaction periods between about 30 minutes and several hours are suitable and are normally required.

A number of olefins are suitable for the present invention. The lower molecular weight, normally gaseous, and alpha olefins are preferred primarily because of their ready availability and because of the demand for the organometallic products they generate. Thus, ethylene and propylene are preferred examples. Numerous other alpha and beta olefins are also effective, including for example 1-butene, 1-octene, isobutylene, styrene, 2-butene, 1-dodecene, cyclohexene and other substituted and branched olefins. When desired, mixtures of olefins can be employed to result in mixed alkyls. Mixed alkyls can be readily generated by a two-state operation involving separate processing steps with separate provision of different olefin feeds. Alternatively, the mixed alkyl can be generated by concurrent pressure of and reaction of both of the desired olefins to form a product having mixed alkyl substituents. The products of the various embodiments of the process can then be, for example, diethyl magnesium, di-n-propyl magnesium, di-n-butyl magnesium, ethyl n-propyl magnesium, ethyl magnesium hydride, dioctyl magnesium and numerous others.

The mode of operation and the benefits of the present invention are evident from the detailed description and examples below. In the examples all parts and proportions are parts by weight or weight percentages, except where otherwise stated.

*Example I*

About 20 parts of finely divided magnesium hydride was charged to an autoclave under carefully preserved anhydrous conditions and in the absence of atmospheric oxygen. In addition approximately 33 parts of freshly prepared aluminum hydride was provided as a catalyzing additive. The autoclave was also charged with 1300 parts of diethyl ether. The autoclave was closed, purged and pressurized with dry ethylene at about 1,000 pounds per square inch pressure gauge. The contents was raised in temperature to about 100° C. and maintained at this level while the mixture was vigorously agitated for approximately 1½ hours.

Upon completion of this reaction period the autoclave was permitted to cool to room temperature and then vented slowly to atmospheric pressure. The ether solvent was then removed by vacuum distillation at or below room temperature, leaving a solid product. Analysis of the solids showed a conversion of about 28 percent of the magnesium hydride charged to diethylmagnesium. The overall yield amounted to 80–90 percent, based on consumed magnesium hydride, for this particular cycle. A preferred recovery method involves the filtration of the reaction mixture, whereby the unreacted magnesium hydride is separated. The filtrate is then subjected to vacuum distillation, as above, and thereby a concentrated, solid dialkyl magnesium product is isolated. In normal operations, the magnesium hydride residuum from the first cycle is retained and charged to a succeeding cycle and thus a final conversion of between 80 and 90 percent of all the magnesium hydride charged to diethyl magnesium is achieved.

As previously indicated the presence of a catalytic amount of a hydride or a hydrocarbon compound of aluminum, boron or zinc is necessary for an effective rate of reaction required for commercial feasibility. The drastic benefits realized through a catalyst are apparent from a contrast of the results achieved above with a comparable reaction carried out in the absence of any catalytic component as shown by the following example.

*Example II*

The procedure of Example I above was essentially repeated, except that the magnesium hydride charged was about 10 parts, and, in addition, the reaction mixture did not contain a catalyst. After pressurizing with ethylene gas at approximately 1000 pounds and maintaining for a reaction period of 43 hours, it was found that only 2 percent of the magnesium compound originally charged had been converted to an alkyl magnesium product, in this instance predominantly dibutyl magnesium.

It is thus apparent that the catalyst employed in Example I was responsible not only for a very high difference in conversion to dialkyl magnesium product, but further that the necessary reaction period was only about 4 percent of that required for the low yield in the instant example.

A repetition of the operations of Example II (not catalyst), but employing, for example, normal pentane as the liquid reaction medium or dioxane also gave essentially negative results, that is no significant production of dialkyl magnesium was realized in reaction periods of from 15 to 67 hours.

As heretofore stated, the alkyl or aryl compounds of the enumerated metals are also highly effective as catalysts. Thus when Example I is repeated but, instead of aluminum hydride, triphenyl aluminum, triethylaluminum or other alkyl aluminum compounds such as diethyl aluminum hydride are employed, in comparable or even lower molar concentrations, similar good acceleration of the reaction and improvement in the yield is achieved.

The other catalysts of the invention are also similarly effective, but in varying degree. For example, when diethyl zinc, triethyl boron, or diborane, are used in the operation of Example I, similar good yields are realized.

As heretofore mentioned, when the quantity of catalyst is increased to relatively high proportions, different recovery techniques are desirable, as shown by the following example.

*Example III*

A reaction charge is prepared and charged to an autoclave, consisting of about 1500 parts of di-isopropyl ether, 26 parts of magnesium hydride, and about 137 parts of triethyl aluminum. The autoclave is sealed and heated to a temperature of 85–90° C. Propylene pressure is applied to the extent of 450 pounds, and a supra-atmospheric pressure is maintained in this range for about 3 hours, the reaction mixture being vigorously agitated. The autoclave and contents are then cooled to ambient temperatures, excess pressure is relieved by venting, and the contents are filtered, thus separating unreacted magnesium hydride. The filtrate is then subjected to a distillation under vacuum, whereby the bulk of the di-isopropyl ether is removed. The residuum, containing both dipropyl magnesium and triethyl aluminum, is then extracted with about 300 parts of hexane, which dissolves the triethyl aluminum, but not the dipropyl magnesium. Filtration of the system then results in isolation of dipropyl magnesium in good yield. The triethyl aluminum removed by the extraction with hexane is recovered by distillation and is used in further production of the desired alkyl magnesium compound.

To further illustrate the process, employing a typical aromatic hydrocarbon reaction medium or solvent, the following example is illustrative.

*Example IV*

In this operation, the charge to the reaction zone is 26 parts of magnesium hydride, 1.5 parts of diethyl zinc, and about 2000 parts of dry, pure toluene. In addition, about 200 parts of liquefied isobutylene is charged. The autoclave is sealed and heated, with internal agitation to about 100° C., a pressure of roughly 500 p.s.i.g. being generated in part and in part established by imposing inert gas pressure on the contents.

After reacting at these conditions for about 4 hours, the reactor and contents are cooled and excess pressure is vented. After separation of unreacted, solid, magnesium hydride, and vaporization of the toluene reaction medium by vacuum distillation, a high recovery of diisobutyl magnesium is achieved.

As heretofore mentioned, the process is readily adaptable to produce dialkyl magnesium products having mixed alkyl substituents, as in the following example.

Example V

The procedure of Example I is repeated, except that a total pressure of about 1500 pounds is imposed on the reacting mixture, using ethylene and propylene in equal proportions. The resultant alkyl magnesium product obtained is a mixture predominantly of ethyl propyl magnesium and with smaller proportions of diethyl magnesium and dipropyl magnesium.

The reaction media employed in the process can also be selected from other ethers than the alkyl ethers, as shown by the following example.

Example VI

In this example, the charge consisted of about 20 parts of magnesium hydride and 3400 parts of anisole. Approximately 3 parts of lithium aluminum hydride was employed as a catalyst. A pressure of about 940 pounds of ethylene is applied at a temperature of 100° C. for a reaction period of about three hours, and a good conversion of magnesium hydride is obtained, with a high yield to dialkyl magnesium compounds. The alkyl substituent includes a higher than usual proportion of alkyl substituents of longer chain length than 2 carbon atoms, showing that significant chain growth occurs.

When other aryl, or aryl-alkyl, or cycloalkyl ethers are employed in the above manner, similar results are provided. For example, substituting ethyl-phenyl ether, diphenyl oxide, or tetrahydrofuran in the foregoing example give generally similar results.

As heretofore stated and shown above, the procedure of the invention always involves the use of a reaction medium which is a normally liquid material selected from the group consisting of mildly basic ethers and aromatic hydrocarbon liquids. Basicity, with reference to the present invention, refers to the tendency of the compound to donate electrons to a reference Lewis acid. The determination of or calculation of this attribute is explained fully by Branch and Calvin (Theory of Organic Chemistry, Prentice-Hall, Inc., New York, 1946, Ch. VI, p. 204). As heretofore indicated, ethers having a basicity equal to or less than di-n-butyl ether are satisfactory for the process. Such ethers exhibit good solvency for the alkyl magnesium compounds formed, but do not significantly attack or react with these product compounds at reaction conditions. It is found, however, that the ethers which are of the strongly basic type, for example, p-dioxane and others are undesirable in that, although the reaction apparently occurs, the action of the ether is not restricted to the desired solvency, but a substantial amount of cleavage and interreaction occurs both with the dialkyl magnesium compounds and with the magnesium hydride reactant. Examples of suitable solvents include, for example, dimethyl ether, diethyl ether, ethyl propyl ether, di-isopropyl ether, di-n-butyl ether, and other diethers having the required basicity not exceeding that of di-n-butyl ether.

As also indicated, aromatic hydrocarbon liquids are perfectly acceptable although frequently somewhat higher proportions are desired, as in Example IV. In addition to the toluene employed in Example IV, benzene, M-xylene, mesitylene, the triethyl benzenes, and other aromatic liquids are quite effective as alternate reaction media liquids. Thus these, and other, aromatic hydrocarbon liquids can be substituted for the liquids employed in the other examples and generally similar results will be provided.

Frequently it is desired to increase the fluidity, or the proportion of liquid relative to the solid magnesium hydride originally present in the reaction system in cyclic operations but without increasing the quantity of required solvent component. In such instances, frequent resort is made to using entirely inert alkane hydrocarbon liquids as a component of the reaction charge. This is perfectly permissible, providing that the quantity of ether or aromatic hydrocarbon solvent present is sufficient to function as a solvent for the dialkyl magnesium compounds to be produced. In other words, the alkane hydrocarbon portion merely acts as an inert liquid phase diluent. In all instances, the liquid phase provided in the various embodiments of the process should be in sufficient magnitude to assure a high degree of mobility of the reaction system. Generally, then, the reaction medium should be in the proportions of at least two times the proportion of magnesium hydride. Preferably, however, the proportions are from 5 to 20 times the weight of the magnesium hydride. Desirably, in prefered embodiments of the process, the quantity of reaction liquid medium provided is also adjusted to assure that all the alkyl magnesium compound formed will be dissolved in the medium. This is not absolutely essential but is highly desirable in that such proportions assure that a good separation of product from the magnesium hydride reactant can be made following each cycle of a cyclic batch operation, or upon discharge from a continuous operation.

As heretofore mentioned, the most frequent embodiments of the process of the invention employ the normally gaseous alpha olefins (1-alkenes) as the olefin source for the process. However, monoolefins which are normally liquid materials are also quite suitable. Thus n-butene, isobutylene, 1-pentene, 1-octene, hexenes, and other easily liquefied or normally liquid olefins can be employed as charge components. When these, or other higher olefins are used as olefins in the foregoing examples, similar results are obtained, and, in fact, with the higher olefins, pressures of the order of several atmospheres are frequently quite satisfactory. The more elevated pressures previously described are needed primarily to assure ultimate contact of gaseous or volatile olefins with the magnesium hydride solids.

The magnesium hydride employed is comminuted or finely divided. In fact, the greater the degree of division or subdivision of the solids fed, normally the better the conversion or integrated reaction obtained. Customarily, a suitable size is that obtained as a fine powder by the direct hydriding under carefully controlled inert conditions, of said divided magnesium metal. A powdery product of magnesium hydride passing almost entirely through a hundred mesh screen is a suitable range, and in some instances further mechanical comminution prior to reacting in the present invention is highly desirable. Alternatively, however, if a coarser magnesium hydride feed is provided, the process is fully operable, but the integrated degree of reaction is lower.

The pressure and temperature employed in any specific embodiment of the process are quite important, but are not individually critical. By this is meant that a reasonable degree of latitude is available on either of these specific factors. The use of higher temperatures and of higher pressures tend to promote or increase the amount of polymer, or longer chain alkyl substituents, particularly when the olefin being reacted is a normally gaseous material, especially ethylene. On the other hand, the more drastic pressures and temperatures tend to increase the general rate of reaction. The preferred conditions, then, usually involve moderate pressures, of from about 30 atmospheres, or about 400 pounds pressure, and moderate temperatures, of from around 90° C. to 150° C. In order to assure a good overall rate of reaction, a high degree of subdivision of the magnesium hydride fed, plus vigorous agitation during the course of reaction, are highly desirable. The agitation prevents agglomeration of the solid particles into larger masses, and also facilitates solution of the alkyl magnesium products in the reaction liquid.

Having described the process of the invention, what is claimed is:

1. The process of making an alkyl magnesium compound comprising reacting magnesium hydride with an olefin hydrocarbon in a liquid reaction medium as hereafter defined and in the presence of a catalyst, said catalyst being selected from the group consisting of the hydrocarbon and hydride compounds of aluminum, boron and zinc, the reaction medium being a solvent for the alkyl magnesium compound selected from the group consisting of ethers, having a basicity not in excess of di-n-butyl ether, and aromatic hydrocarbons, the reaction being carried out under pressure and at a temperature of from about 50 to 200° C.

2. The process of making an alkyl magnesium compound comprising reacting magnesium hydride with an olefin hydrocarbon in a liquid-reaction medium as hereafter defined and in the presence of a catalyst, said catalyst being selected from the group consisting of the hydrocarbon and hydride compounds of aluminum, boron and zinc, the reaction medium being a solvent for the alkyl magnesium compound selected from the group consisting of ethers having a basicity not in excess of di-n-butyl ether, and aromatic hydrocarbons, the reaction being carried out at an elevated pressure of from about 30 atmospheres to 700 atmospheres and at a temperature of from about 50 to 200° C., and then separating at least part of the liquid phase from any solid, unreacted magnesium hydride, and then distilling the reaction medium from the alkyl magnesium compound.

3. The process of making diethyl magnesium comprising reacting magnesium hydride with ethylene in a liquid reaction medium comprising diethyl ether and in the presence of a minor amount of an aluminum hydride as a catalyst, the reaction being carried out at a pressure of from about 30 to 200 atmospheres and at a temperature of from about 90° to 150° C.

4. The process of making dipropyl magnesium comprising reacting magnesium hydride with propylene in a liquid reaction medium comprising di-isopropyl ether and in the presence of a catalytic amount of an alkyl aluminum compound, the reaction being carried out at a pressure of from about 30 to 200 atmospheres and at a temperature of from about 90° to 150° C.

5. The process of making di-isobutyl magnesium comprising reacting magnesium hydride with isobutylene in a liquid reaction medium comprising toluene and in the presence of a catalytic amount of an alkyl zinc compound, the reaction being carried out at a pressure of from about 30 to 200 atmospheres and at a temperature of from about 90° to 150° C.

References Cited in the file of this patent
UNITED STATES PATENTS 2,826,598    Ziegler et al. _____ Mar. 11, 1958

OTHER REFERENCES

Hurd: "Chemistry of the Hydrides," New York, John Wiley & Sons Inc., 1952 (pp. 4–5 relied on).